United States Patent [19]

Camras

[11] 4,455,581

[45] Jun. 19, 1984

[54] SELF-CORRECTING RECORD-PLAY SYSTEM AND METHOD

[75] Inventor: Marvin Camras, Glencoe, Ill.

[73] Assignee: IIT Research Institute, Chicago, Ill.

[21] Appl. No.: 293,838

[22] Filed: Aug. 18, 1981

[51] Int. Cl.³ .................. G11B 27/36; G11B 15/02
[52] U.S. Cl. .................................... 360/31; 360/25; 360/53
[58] Field of Search .................... 360/31, 25, 51, 53

[56] References Cited

U.S. PATENT DOCUMENTS

| | | | |
|---|---|---|---|
| 2,791,640 | 5/1957 | Wolfe | 360/25 |
| 3,359,548 | 12/1967 | Yoshii et al. | 360/53 |
| 3,365,708 | 1/1968 | Markakis | 360/53 |
| 3,810,236 | 5/1974 | Horowitz et al. | 360/53 |

Primary Examiner—Vincent P. Canney
Attorney, Agent, or Firm—Hill, Van Santen, Steadman & Simpson

[57] ABSTRACT

A transducer head configuration is utilized which is operable by means of recording pulses of extremely short duration and of low duty cycle. Provision is made for reading the recorded magnetization between recording pulses and correcting same pulse prior to substantial movement of the record medium relative to the transducing gap.

1 Claim, 8 Drawing Figures

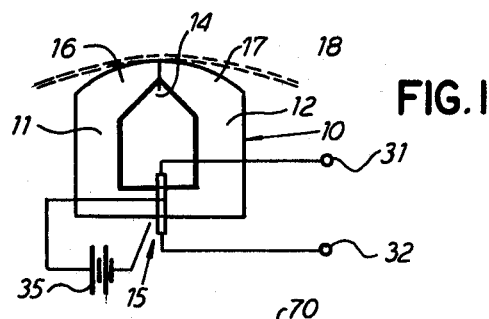
FIG. 1
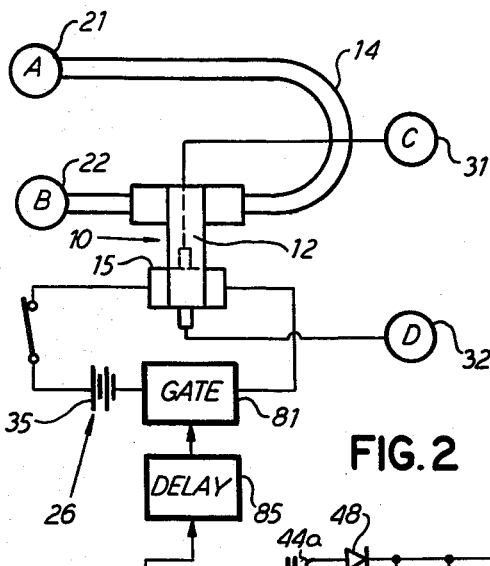
FIG. 2
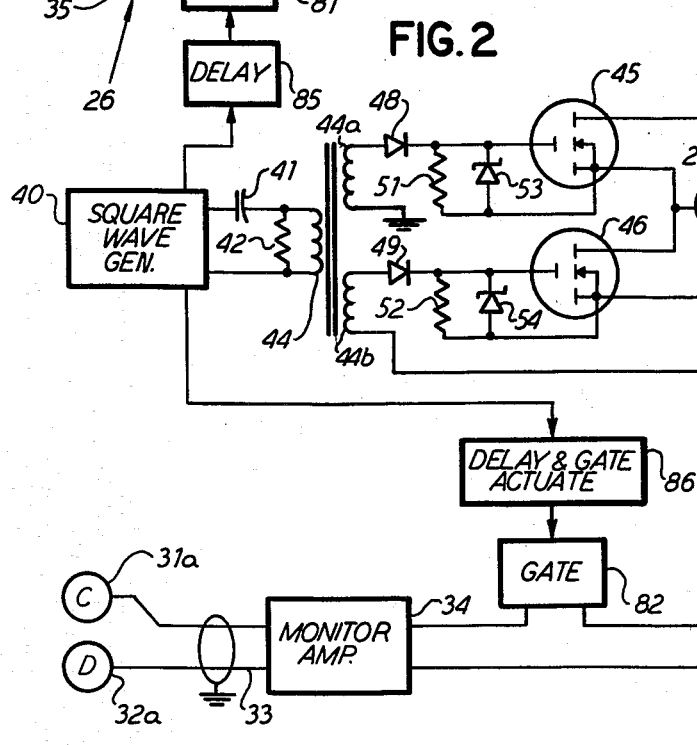
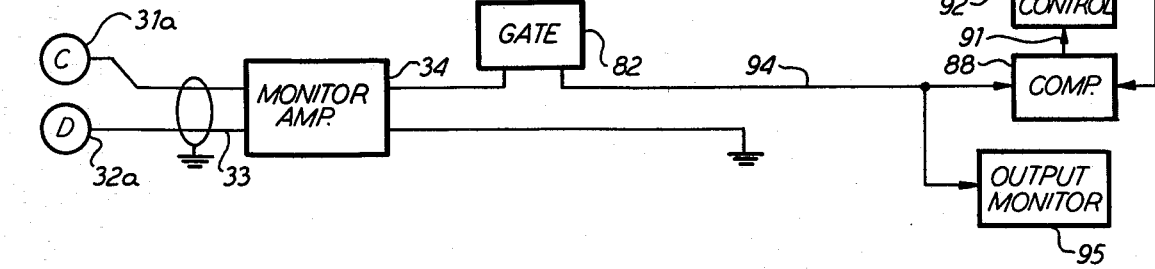
FIG. 3
FIG. 4
FIG. 5
FIG. 6
FIG. 7
FIG. 8

SELF-CORRECTING RECORD-PLAY SYSTEM AND METHOD

BACKGROUND OF THE INVENTION

In the magnetic recording field, there has been a continuing development effort toward producing magnetic transducer heads of higher and higher resolution. As the transducing gap of the head is reduced in thickness, with a consequent reduction in gap reluctance, higher input signals to the head are generally required to produce a given level of recorded magnetization. The requirement for the use of a superimposed high frequency bias signal can result in undue heating of the head, particularly as the coercivity of the record medium is increased for the sake of higher resolution. The undue heating of the transducer head is undesirable not only because of possible damage to the record medium, but also because the record medium coating material may be softened and accumulate on the transducer head if the transducer head is operated at relatively high temperatures and slow speeds. Also the magnetic properties of the head core and of the record medium may be adversely affected.

While magnetic records can be monitored shortly after being made, such monitoring has typically been for the purpose of verifying the fact of a recording being made without the availability of immediate correction of the record in the event of an inaccuracy in the recorded signal.

SUMMARY OF THE INVENTION

Accordingly, it is an object of the present invention to mitigate the foregoing problems and to provide a transducer head of higher resolution capability and a head capable of more accurate recording while avoiding the problem of high operating temperature.

In accordance with the invention, a transducer head configuration is utilized which is operable by means of recording pulses of extremely short duration and of low duty cycle; further, provision is made for reading the recorded magnetization on the record medium between recording pulses and correcting the recorded magnetization as necessary in a subsequent recording pulse prior to substantial movement of the record medium relative to the transducing gap.

By the use of such recording pulses in such a way as to provide a required recording bias in conjunction with the signal to be recorded, much less recording energy is needed and the head is able to operate at a much lower temperature, thus also reducing any danger of harming the tape or of gathering tape coating material at record medium contacting surfaces of the transducer head. A turn-in-gap spacer can be made of thinner material having higher resistivity without excessive heating. With audio frequency recordings the duty cycle can be made exceptionally small while assuring the fidelity of the recorded magnetization. For example, the interval between pulses can be about twelve microseconds and the pulse width can be in a range from about twelve nanoseconds to four nanoseconds for a duty cycle of 0.001 to 0.00033, or even shorter. The short duration of the fast pulses allows modification of the field at the gap before the record medium has moved appreciably. Pulse bias is especially effective with thin film gap spacers (e.g. used as head windings) since angstrom magnitude film thicknesses have high resistance and prohibitive losses when used in a conventional manner.

The fine particle (or thin film) structure of the record tape magnetizable layer provides response to nanosecond pulses. Such pulse type magnetic fields are sufficient to set the magnetic domains of the recording layer of the record medium. It is not necessary to maintain the magnetic field once the domains are set, so there is a great savings in turning off the applied magnetic field between the pulses and using the off interval to advantage (e.g. for monitoring or linearization of the recording). To read the recorded magnetization in such off intervals, a flux sensitive pickup such as a Hall element can be utilized although transducers based on magnetoresistance or magnetic modulator effects can also be used. Feeding back the playback signal through a comparator with a slight delay or memory to modify the subsequent recording pulse (when the initial magnetization deviates from the input signal) allows recordings to be made on the record medium which are corrected for variations in tape-head contact, dropout effects, biasless recording, etc.

BRIEF DESCRIPTION OF THE DRAWINGS

FIG. 1 is a somewhat diagrammatic side elevational view of a magnetic transducer system in accordance with the present invention;

FIG. 2 is a somewhat diagrammatic end view of the transducer head of FIG. 1 and shows an exemplary electric circuit diagram for operating the transducer head in accordance with the system and method of the present invention;

FIG. 3 illustrates a pulse waveform as generated by the circuitry of FIG. 2;

FIG. 4 shows a resultant waveform as supplied to the transducer head of FIGS. 1 and 2 during recording mode;

FIG. 5 illustrates a signal waveform which has been superimposed on the pulse signal of FIG. 3 to provide the resultant waveform of FIG. 4;

FIG. 6 is a diagram for illustrating the operation of the gating circuits of FIG. 2;

FIG. 7 shows a different pulse waveform which may be utilized in place of the waveform of FIG. 3 in carrying out the system and method of the present invention; and FIG. 8 shows a further waveform which may be utilized in place of the waveform of FIG. 4 in carrying out the system and method of the present invention.

DETAILED DESCRIPTION

FIG. 1 is a side view of a transducer head useful in carrying out the recording and playback operations of the present invention. The transducer head comprises a ring type core 10 with a pair of core pieces 11 and 12 separated by a gap conductor element 14 in the transducing or coupling region of the core, and separated by a Hall element assembly 15 at a gap region remote from the transducing region. A tape record medium travels successively over the pole pieces 16 and 17 of the transducer head along a tape path indicated at 18.

FIG. 2 is an end view of the head assembly 10 and shows the gap conductor 14 as having respective terminals 21 and 22 which are connected by means of suitable electrical conductors with terminals 21a and 22a of a driver circuit 24. FIG. 2 also shows an energizing circuit 26 associated with the Hall element 15. In particular, terminals 31 and 32 in FIGS. 1 and 2 are connected with terminals 31a and 32a of a shielded cable 33, leading to a monitor amplifier 34. FIG. 1 may be taken as illustrating the playback of a previously recorded tape whereby a direct current source 35 provides a unidirectional current longitudinally of the Hall element 15 (as viewed in FIG. 2), so that terminals 31 and 32 supply a continuous output analog signal in accordance with the signal flux threading the loop magnetic core 10 and thus traversing the Hall element 15 at the region of the back gap between core pieces 11 and 12.

During recording operation with the system of FIG. 2, a square wave generator 40 has its rectangular waveform output differentiated by means of capacitor 41 and resistor 42 so as to generate opposite polarity pulses as indicated in FIG. 3 at transformer 44. The secondary windings of transformer 44 drive respective power field effect transistors 45 and 46 so as to provide alternating pulse bias at terminals 21a, 22a as in FIG. 3. As indicated respective secondary windings 44a and 44b of transformer 44 are oppositely poled so as to alternately supply pulses of positive polarity via the respective diodes 48 and 49, the gate biasing circuits being completed by respective resistors 51 and 52 which are shunted by respective zener diodes 53 and 54 (built into the transistors). The zener diodes serve to protect the gates of the field effect transistors 45 and 46. A fifty volt power supply is connected to terminals 56 and 57, terminal 56 receiving plus twenty-five volts relative to ground potential and terminal 57 receiving minus twenty-five volts relative to ground potential. Resistors 58 and 59 are connected in series between terminals 56 and 57 to act as a voltage divider for the common power supply and have a common circuit point 60. Capacitors 61 and 62 are also connected across terminals 56 and 57 and have a common circuit point 63 connected with terminal 22a.

A signal to be recorded is supplied from any suitable recording signal source 70 via amplifier 71 and recording signal driver 72 to a transformer 73 having its secondary winding 74 connected between circuit points 60 and 63. In this way, where the recording signal has a waveform as indicated in FIG. 5, a current waveform as indicated in FIG. 4 is actually supplied to the gap conductor 14 via terminals 21a, 22a.

As indicated in FIG. 6, gates 81 and 82 may be placed in open (transmissive) condition during time intervals such as represented at 82a, 82b, 82c, etc. after time delays such as indicated at 83a, 83b, 83c, etc. The time delays are such that a signal once recorded on the record medium at tape path 18 is immediately reproduced by means of Hall element 15 during an interval such as 82a. Delays 85 and 86 are such that the monitor amplifier 34 supplies to comparator 88 only a reproduction of the recorded signal (without any influence from the recording signal field corresponding to the recording current indicated in FIG. 4). Thus, the signal is completely recorded during an interval such as 83a, and playback of the recorded signal at 82a is dependent only on the actually recorded signal. The delay of delay element 86 may be somewhat greater than the delay provided by delay element 85 to eliminate transients resulting from the operation of the Hall element exciter gate 81. The gates 81 and 82 may be six diode switchers or other standard types of gating circuits. Delay element 86 may be a monostable multivibrator that holds the gate 82 open during the "playback" interval such as indicated at 82a. Thus the logical one output level from delay element 86 may have a duration corresponding to the time interval 82a of FIG. 6, so as to switch gate 82 to the nonconducting mode before the next pulse of the sequence of FIG. 3 or FIG. 4. Alternatively, delay 86 may comprise a monostable multivibrator which may turn off the gate 82 during intervals such as indicated at 83a, the monostable multivibrator being actuated after an appropriate delay from the previous recording pulse so that it turns off the gate 82 just prior to the recording interval and turns on the gate 82 after the recording interval.

In the comparator 88, the monitored signal magnetization from the record tape during a transmissive interval of gate 82 is compared with the desired signal from recording signal source 70. Any error between the desired and actual recorded signal thus results in an error signal at output 91 of comparator 88. Such error signal may be supplied to a gain control circuit 92 which controls the amplification of amplifier 71 so that during the next recording interval, the recorded magnetization is modified so as to reduce the error signal at output 91 of comparator 88. Thus, the monitored and gated playback signal which is present during interval 82a, FIG. 6, is utilized during recording interval 83b to apply any necessary correction to the signal recorded during previous interval 83a. This is possible because of the high repetition rate of the recording intervals 83a, 83b, in comparison to the time required for the tape to traverse the recording or coupling region of the recording head.

In order to use the system of FIG. 2 for erasing, recording signal driver 72 may be disconnected from winding 73 so that the waveform of the current applied to the turn-in gap conductor 14 is as represented in FIG. 3. The current pulses of FIG. 3 would be supplied to the conductor 14 at a sufficiently high repetition rate in comparison with tape velocity such that a tape element does not move away from the influence of the head gap in the time between successive magnetic field pulses. Thus, each element on the tape magnetizable layer is subjected to a series of alternately opposite magnetic field pulses of progressively decreasing intensity.

During recording operation, compensation for any residual magnetization of the magnetic core 11, 12 may be effected so that the gated playback signals at conductor 94, FIG. 2, are a function only of the tape magnetization and not of the magnetization of the magnetic core. This may be effected by reading the tape magnetization via the Hall element 15 in the absence of a tape at the recording gap of the head 10 and introducing a corresponding compensation in the circuit of the Hall element 15 or at the comparator 88, for example. The effect of core magnetization at the turn-in gap conductor 14 is reduced by the provision of a relatively large additional nonmagnetic gap in the magnetic circuit of the core. The Hall element 15, by increasing the dimension of the back gap between core parts 11 and 12, is beneficial in this respect.

Examples of magnetic core configurations which reduce the effect of core magnetization are found in Camras U.S. Pat. No. 3,591,729 issued July 6, 1971.

The waveforms of FIG. 3 and FIG. 7 can be utilized for effecting erasure of a prerecorded magnetic record tape or may be utilized in conjunction with the self correcting recording system as described in conjunction with FIG. 2. Preferably, each of the pulse waveforms has a very low duty cycle, preferably one percent or less with very high frequency components of the pulses or damped waves producing magnetic fields of corresponding waveform. Thus, each of the waveforms of FIG. 3 and FIG. 7 has the advantage of giving higher magnetic fields than can be obtained otherwise without excessive heating, such high field intensities being useful for very high coercivity tapes and/or for thick tape magnetizable layers. Such pulse waveforms use less energy than other methods and the transducer heads can be very small, for example with microdeposited core configurations where heat dissipation and conductor size are otherwise severe problems. The long intervals between pulses or wave trains in relation to the intervals of the pulses or wave trains themselves allows sampling of the recorded magnetization as shown by the circuit diagram of FIG. 2 between recording (or erasing) intervals. Thus feedback type correction on subsequent recording impulses as shown in FIG. 2, for example, may be carried out. The higher magnetic fields penetrate deeper into a recording magnetizable layer allowing thicker layers to be used. Eddy currents in the gap spacer are more effective in sharpening the spacial field because of the high pulse train frequency. A quieter erasing or biasing is obtained by the stronger fields and higher frequencies possible with these waveforms. Though the duty cycle is low, the repetition rate is so high that the tape has not moved appreciably between trains of pulses.

FIG. 3 is an example of a suitable waveform where the pulse duration is about twenty nanoseconds, while the time between pulses is two thousand nanoseconds, for example, corresponding to a fundamental frequency of 250 kilohertz. In an audio recorder where twenty kilohertz is the maximum signal frequency, such a signal would have at least 12.5 pairs of pulses as in FIG. 3 to magnetically imprint each cycle of the highest audio frequency. If the tape speed is 3.75 inches per second then the recorded wavelength for the highest audio frequency is 0.0001875 inch. With a head gap of one tenthousandth inch which is typical, and with the tape moving a distance between pulses of 7.5 microinches, an element of tape is subjected to thirteen pulses while moving across the head gap, confirming that even the shortest wavelengths are imprinted by the pulses with fine gradations. A waveform as in FIG. 3 of magnetic field intensity sufficient to magnetize the tape to saturation may be used to erase the tape if symmetrical as shown. A similar wave of equal or less field intensity but with pulses unsymmetrical, e.g. with positive pulses progressively increasing in amplitude as the alternating negative pulses progressively decrease in intensity and vice versa at the highest frequency to be recorded, faithful recording will be obtained on the tape according to the envelope of dissymmetry. Similarly if a wave such as indicated in FIG. 4 is used where the pulses are superimposed on a lower frequency wave to be recorded, the result will be a magnetization of the tape record medium such as represented in FIG. 5. A waveform such as shown in FIG. 3 can be generated by differentiating a square wave as by means of a circuit such as indicated at 41, 42 in FIG. 2.

By way of example and not of limitation, the circuit components of FIG. 2 may be implemented as follows:
capacitor 41 (500 picofarads);
resistor 42 (100 ohms);
resistors 51 and 52 (560 ohms each);
power field effect transistors 45 and 46 (type 2N3660);
capacitors 61 and 62 (0.1 microfarad);
resistors 58 and 59 (750 ohms each).

The capacitor bypassing secondary winding 74 has a value such that terminal 22a and circuit point 63 are essentially grounded with respect to the pulse signal of FIG. 3, for example. Output monitor 95 may comprise an audio transducer and/or a video display unit, or a data signal monitor, or the like.

A different kind of "imprinting" waveform as shown in FIG. 7 comprises a damped wave train of extremely high frequency and such a waveform may be obtained by shock exciting a resonant circuit. The resonant circuit may comprise the head inductance itself with inherent capacitance of its wiring or with added capacitance or inductance. The duty cycle here also is preferably quite low. A symmetrical (unmodulated) waveform as illustrated in FIG. 7 (preferably initiated alternately with positive going and negative going half cycles) is advantageous for erasing purposes. Offsetting the waveform, for example so that positive cycles have higher amplitude, or by superimposing a signal waveform by analogy with FIG. 4 will record a magnetization on the tape. The recording waveforms such as indicated in FIG. 7 may have only a single cycle, i.e. a half cycle positive and a half cycle negative during each recording interval. Such double pulses can be obtained from a differentiating circuit by exciting the input with pulses such as those in FIG. 3 instead of with the square wave. In other words, such a waveform would be the second derivative with respect to time of a square wave signal.

The recording waveform of FIG. 8 is advantageous in comparison to the waveform of FIG. 4 since it provides no net magnetic field in the core 10 during playback. The waveform of FIG. 8 may be generated by the circuit of FIG. 2 if the gate electrode of each of the transistors 45, 46 is negatively biased enough so that the signal to be recorded (e.g. FIG. 5) alone does not produce conduction, but so that the transducers become conductive when the pulses of FIG. 3 are superimposed (via transformer 44). The transistors 45, 46 are normally cut off during operation according to FIG. 4 without positive forward bias, and in addition, the diodes 48, 49 need about 0.7 volt positive bias before they conduct, so the diodes 48, 49 will give operation according to FIG. 8 even without negative bias supply when the amplitude of the signal to be recorded (e.g. FIG. 5) is kept low enough.

In general for erasing a record medium with a given saturation level, the peak amplitude of each pulse (e.g. for the waveform of FIG. 3) or the peak amplitude of the initial half cycle of each pulse in FIG. 7 would provide an erasing field reaching or exceeding such saturation level.

For recording bias, such peak amplitudes in FIGS. 3 and 7 should produce bias magnetic fields in the record medium magnetizable layer exceeding the coercivity of such magnetizable layer.

It will be apparent that many modifications and variations may be effected without departing from the scope of the novel concepts and teachings of the present invention.

I claim as my invention:

1. A transducer system comprising recording means for recording a signal with a given signal frequency component on a record medium, said recording means having a magnetic core defining a coupling region for coupling of the magnetic core with the record medium, and means coupled with said magnetic core for producing a pulse type recording field at said coupling region for recording a signal pulse on the record medium over a distance along the record medium which is small in relation to a recorded wavelength of the signal frequency component of the signal to be recorded, and playback means coupled with said record medium at said coupling region of said magnetic core and operative for reproducing each signal pulse immediately after recording thereof while the recorded signal pulse on the record medium remains in coupling relation with said magnetic core at said coupling region and prior to the recording of a next succeeding signal pulse at said coupling region, said recording means having means coupled with said playback means for producing a series of pulse type recording fields at said coupling region each based both on an instantaneous value of a signal to be recorded and on the amplitude of a previously recorded signal pulse as reproduced by said playback means such that a previously recorded signal pulse on the record medium can be corrected prior to leaving said coupling region.

* * * * *